United States Patent [19]
Kessel et al.

[11] Patent Number: 4,501,033
[45] Date of Patent: Feb. 26, 1985

[54] BED FRAME HAVING SWIVEL BRACKET FOR HEADBOARD MOUNTING

[75] Inventors: Jason H. Kessel; Henry Alperin, both of Sharon, Mass.

[73] Assignee: West End and Hub Spring Company, Stoughton, Mass.

[21] Appl. No.: 497,005

[22] Filed: May 23, 1983

[51] Int. Cl.³ .................... A47C 19/00; F16C 11/00
[52] U.S. Cl. .................. 5/200 R; 5/282 R; 5/304; 403/4; 403/117; 403/199
[58] Field of Search .................. 5/201, 200 R, 200 B, 5/200 C, 304, 286, 236 R, 236 B, 238, 240, 282 R, 282 B, 288, 297, 299, 302; 403/4, 117, 199, 189, 262; 108/132

[56] References Cited

U.S. PATENT DOCUMENTS

| | | | |
|---|---|---|---|
| 306,874 | 10/1884 | Thatcher | 403/199 |
| 2,470,869 | 5/1949 | Schmidt | 108/132 |
| 2,587,168 | 2/1952 | Kessler | 403/117 |
| 2,784,421 | 3/1957 | Fredman | 5/201 |
| 2,799,868 | 7/1957 | Sands | 5/282 R |
| 2,842,782 | 7/1958 | Sands | 5/282 R |
| 3,713,181 | 1/1973 | Hougland | 5/201 |
| 3,745,853 | 7/1973 | Deibel et al. | 403/393 |

FOREIGN PATENT DOCUMENTS 1467225  1/1967  France .................. 5/286

Primary Examiner—Alexander Grosz
Assistant Examiner—Vinh Luong
Attorney, Agent, or Firm—Weingarten, Schurgin, Gagnebin & Hayes

[57] ABSTRACT

The bed frame having a swivel bracket for headboard mounting of the instant invention provides a wide range of lateral adjustment for mounting headboards of varying sizes and types. The disclosed invention includes a Hollywood or other type bed frame having side rails. First and second plates having elongated slots are rotatably mounted eccentrically to the ends of the side rails. The plates are manually rotatable between first and second positions. In the first position, the slots extend inwardly of the side rails, and in the second position, the slots extend exteriorly of the side rails. Means are provided for limiting the rotation of the plates, for guiding the plates during rotation, and for retaining the plates in selected ones of the first and second positions.

20 Claims, 6 Drawing Figures

U.S. Patent  Feb. 26, 1985  Sheet 1 of 2  4,501,033
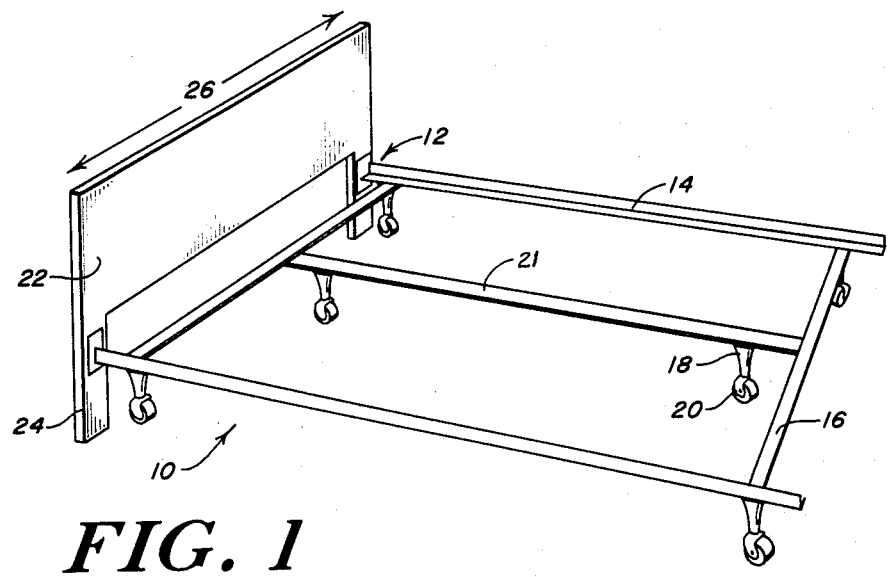
FIG. 1
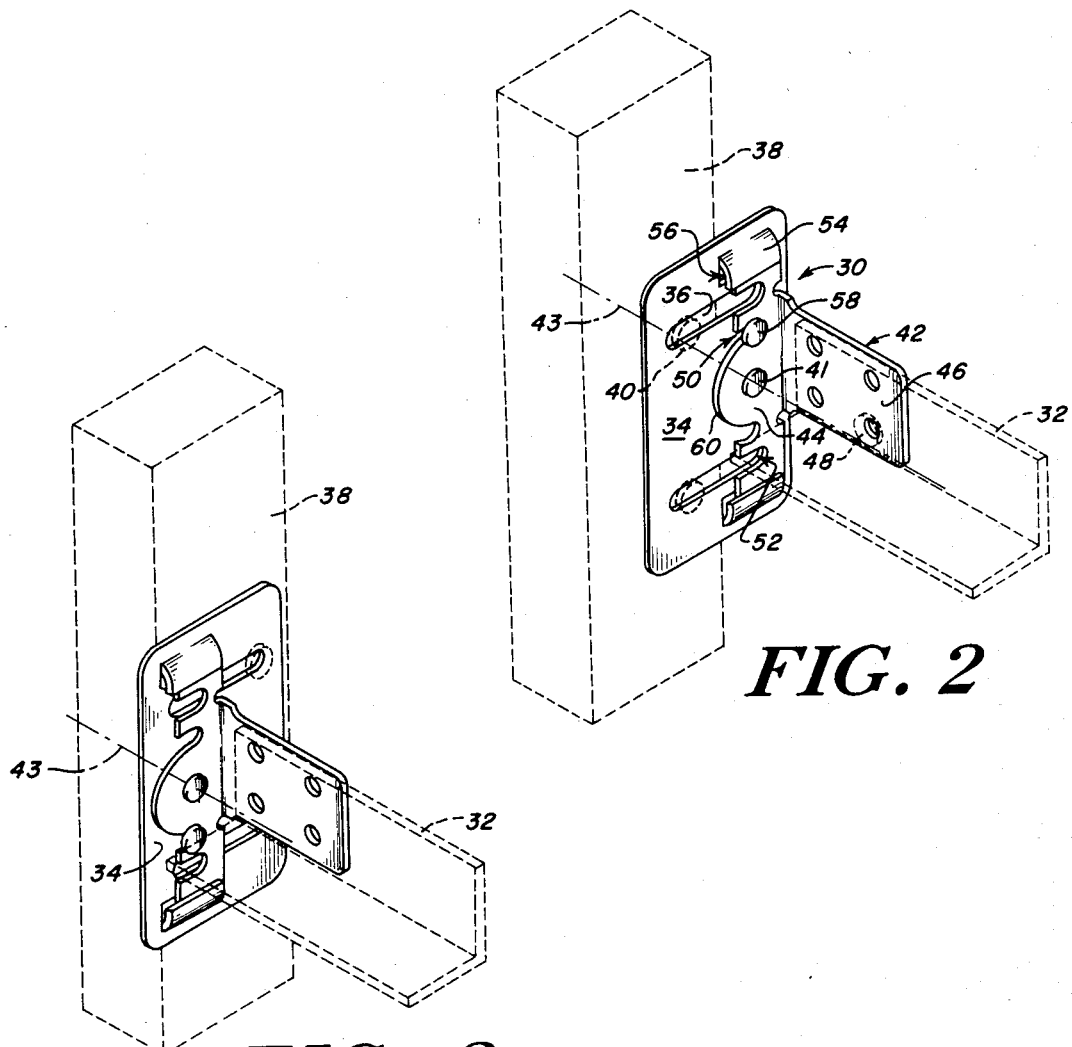
FIG. 2
FIG. 3 ated at 10 is a perspective view of the novel bed frame having a swivel bracket for headboard attachment of the present invention. Swivel brackets 12 to be described are fastened during manufacture to the ends of parallel, spaced-apart side rails 14. The side rails 14 are fastened together by tie arms 16, and are supported a preselected vertical distance on legs 18 having rollers 20. A central support rib 21 is fastened to the tie arms 16 to provide support for a box spring and mattress, not illustrated. Preferably, the various borings, slots, and dimensions of the bed frame are selected to conform to American National Standard ANSI Z357.1 (1981) for bedding products and components. A headboard 22 having upstanding legs 24 is fastened to the swivel brackets 12. The headboard 22 has a lateral dimension 26. As will appear more fully below, the novel bed frame having a swivel bracket for mounting a headboard of the present invention is capable of accepting headboards having variable lateral dimensions in a manner neither requiring additional hardware nor costly and labor-intensive installation.

BED FRAME HAVING SWIVEL BRACKET FOR HEADBOARD MOUNTING

FIELD OF THE INVENTION

This invention is directed to the field of beds, and more particularly, to a bed frame having a novel swivel bracket for headboard mounting.

BACKGROUND OF THE INVENTION

So-called Hollywood bed frames include parallel, spaced-apart side rails for supporting a bed thereon. Apertured angle brackets are typically mounted to the ends of the side rails for mounting a headboard thereto. The apertures of the headboard mounting angle brackets between the side rails define a fixed lateral dimension. However, it is often desirable to mount to the bed frame a headboard having a lateral dimension that is either less than or greater than the lateral dimension defined between the apertures. In these instances, the headboard mounting angle brackets must be manually removed, flipped over, and refastened to the ends of the side rails to provide either a smaller or a larger lateral dimension. However, this technique often results in the misplacement or loss of bolts and other fasteners, and is costly and time-consuming to implement. It is also known to mount separate, apertured plates to the ends of the headboard mounting angle brackets for providing either a larger or a smaller lateral extension therebetween. However, like the above-described heretofore known technique, this procedure often results in lost bolts, is likewise costly and time-consuming to implement, and furthermore necessitates an inventory of additional hardware.

SUMMARY OF THE INVENTION

The novel bed frame having a swivel bracket for mounting a headboard of the present invention provides a wide range of lateral adjustment for accommodating headboards of varying lateral dimensions in a manner neither requiring additional hardware nor the time-consuming and labor-intensive removal and reattachment of the heretofore known devices and techniques. The bed frame having a swivel bracket for mounting a headboard of the present invention includes a plate having elongated spaced-apart headboard mounting slots that is rotatably mounted eccentrically to a bed frame mounting angle bracket fastened to the side rails of a Hollywood bed frame. The plate is selectively rotatable between a first position, where the headboard mounting slots extend to the interior of the side rails, and a second position, where the headboard mounting slots extend to the exterior of the side rails. According to the size of a particular headboard, the plates can both be in their first positions, can both be in their second positions, and one can be in its first position and the other can be in its second position, thereby providing a wide range of lateral adjustment. The bed frame mounting angle bracket includes an arm having an orthogonal apertured flange through the holes of which the flange is riveted or otherwise securely fastened in the factory to the side rails. A rivet or any other suitable means is centrally provided through the arm and eccentrically through the plate to provide an axis about which the plate rotates. In the first and second positions, the ends of the arm are captured in spaced-apart stabilizing slots provided therefor on the plate. First and second spaced-apart slots are provided along the arm one to each side of the pivot axis and respectively intermediate the ends of the arm that cooperate with an upstanding post fastened to the plate to limit the rotation of the plate between the first and second positions.

BRIEF DESCRIPTION OF THE DRAWINGS

Other advantages and features of the present invention will become apparent as the invention becomes better understood by referring to the following exemplary and non-limiting detailed description of the preferred embodiment, and to the drawings, wherein:

FIG. 1 is a perspective view of the bed frame having a swivel bracket for mounting a headboard of the present invention;

FIG. 2 is a fragmentary, perspective view illustrating one position of the bed frame having a swivel bracket for mounting a headboard of the present invention;

FIG. 3 is a fragmentary, perspective view illustrating another position of the bed frame having a swivel bracket for mounting a headboard of the present invention;

DETAILED DESCRIPTION OF THE PREFERRED EMBODIMENT

Referring now to FIG. 1, generally design

Figure 4:
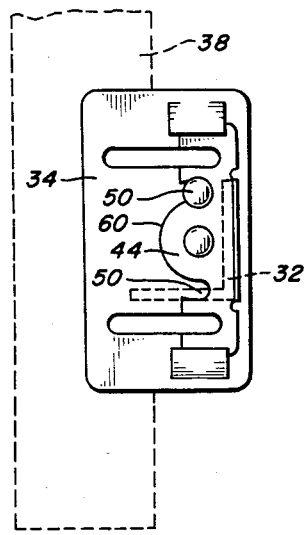
FIG. 4 is an end view of the bed frame having a swivel bracket for mounting a headboard of FIG. 2.

Referring now to FIGS. 2 and 4, a swivel bracket generally designated 30 is fastened to the end of a side rail 32. The swivel bracket 30 includes a plate 34 having spaced-apart elongated slots generally designated 36. A headboard 38, shown dashed, is fastened to the plate 34 by threaded fasteners 40 through the slots 36. The plate 34 is rotatably mounted eccentrically, preferably by a rivet 41, to an angle bracket generally designated 42 for rotation about an axis 43. The angle bracket 42 includes an arm 44 having at right angles thereto an apertured plate 46. The plate 46 is fastened to the end of the side rail 32 by rivets 48 during manufacture.

Figure 5:
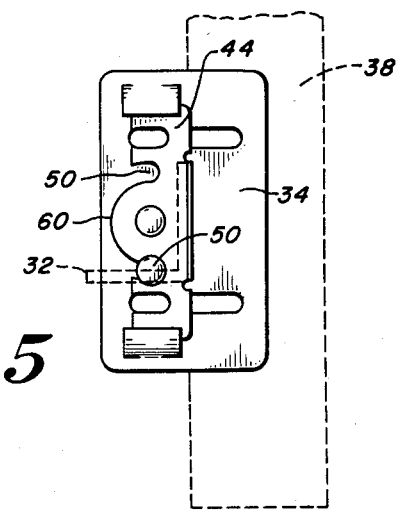
FIG. 5 is an end view illustrating the bed frame having a swivel bracket for mounting a headboard of FIG. 3.

The arm 44 has first and second spaced-apart slots generally designated 50, respectively intermediate the axis of rotation 43 and the corresponding one of its ends. The arm 44 also has third and fourth slots generally designated 52 respectively intermediate the slots 50 and the corresponding one of its ends. The slots 52 are in registration with the headboard mounting slots 40. Flanges 54 are provided on the plate 34 that are spaced apart a distance selected to match the length of the arm 44. The flanges 54 are bent downwardly and to the side defining slots generally designated 56 that are adapted to receive and frictionally engage the ends of the arm 44. An upstanding post 58, such as a rivet, is fastened to the plate 34 in a position selected to abut the confronting wall of the slots 50 to limit the rotation thereof between first and second positions to be described. The post 58 has an enlarged head which cooperates with an arcuate bearing surface 60 provided on the arm 44 which guides the plate 34 during rotation about the axis 43. The plate 34 is rotatable about the axis 43 between a first position illustrated in FIGS. 2 and 4, where the slots 36 extend to the interior of the side rails 32, and a second position illustrated at FIGS. 3 and 5, where the slots 36 extend to the exterior of the side rails 32.

Headboards having variable lateral dimensions can be expeditiously fastened to the side rails 32 by appropriately rotating the plates 34 to provide a lateral dimension that best matches the lateral dimension of a particular headboard. Whenever the two plates 34 are rotated to the position where the slots 36 both extend outwardly of the side rails 32, the maximum lateral dimension is provided. Whenever the plates 34 are rotated to the position where the slots 36 both extend inwardly of the side rails 32, the minimum lateral dimension is provided. An intermediate lateral dimension is provided whenever one of the plates 34 is rotated to its position where the slots extend to the exterior of the side rails, and the other one of the plates 34 is rotated to its position where the slots 36 extend to the interior of the side rails. It will thus be appreciated that the bed frame having a swivel bracket for mounting a headboard of the present invention provides a wide range of lateral adjustment in a manner neither requiring additional hardware nor the heretofore known time-consuming and labor-intensive techniques discussed in the background of the invention.

Figure 6:
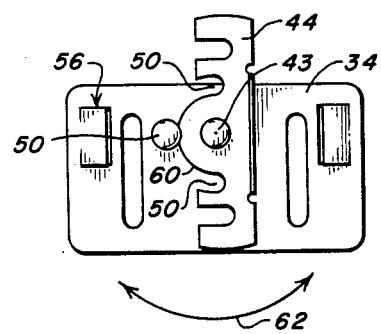
FIG. 6 is an end view illustrating the operation of the bed frame having the swivel bracket for mounting a headboard of the present invention.

In operation as shown in FIG. 6, the plate 34 is rotatable in both a clockwise and a counterclockwise direction as shown by an arrow 62. When a torque is manually applied to the plate 34 in a clockwise sense, the plate pivots about its axis 43, and is guided by the cooperation between the post 50 and the arcuate bearing surface 60 provided on the arm 44 until the post 58 abuts the confronting wall of the bottom one of the slots 50. Concurrently therewith, the ends of the arm 44 are frictionally engaged by, and captured in, the slots 56 provided therefor on the ends of the plate 34. Whenever a counterclockwise torque is manually applied to the plate 34, the plate rotates about its axis 43 until such time as the post 58 abuts the confronting wall of the upper one of the slots 50 and, simultaneously therewith, the ends of the arm are frictionally engaged by, and captured in, the slots 56.

It will be appreciated that many modifications of the presently disclosed invention will become apparent to those skilled in the art without departing from the inventive concept.

What is claimed is:

1. Apparatus for providing a wide range of lateral adjustment for mounting a headboard to a bed frame, comprising:
    first and second spaced-apart side rails having first and second longitudinal axes for supporting a bed;
    first and second plates each having at least one elongated slot having a longitudinal axis for mounting a headboard;
    first means for rotatably mounting said first plate to an end of said first side rail for rotation in the plane of the first plate between a first position, where said longitudinal axis of said at least one elongated slot is generally transverse said first longitudinal axis and extends laterally inwardly to the interior thereof; and a second position, where the longitudinal axis of said at least one elongated slot is generally transverse said first longitudinal axis and extends laterally outwardly to the exterior thereof; and
    second means for rotatably mounting said second plate to an end of said second side rail for rotation in the plane of the second plate between a first position, where said longitudinal axis of said at least one elongated slot is generally transverse said second longitudinal axis and extends laterally inwardly to the interior thereof; and a second position, where said longitudinal axis of said at least one elongated slot is generally transverse said second longitudinal axis and extends laterally outwardly to the exterior thereof.

2. The apparatus of claim 1, wherein said first and said second means each include an angle bracket fastened to corresponding ones of said side rails, and wherein said first and said second plates are rotatably mounted eccentrically to respective ones of said angle brackets.

3. The apparatus of claim 2, wherein each of said angle brackets include an arm having an apertured flange, wherein individual flanges are fastened to corresponding ones of said side rails, and wherein said first and said second plates are rotatably mounted eccentrically to respective ones of said arms about an axis of rotation.

4. The apparatus of claim 3, wherein said flanges are individually riveted to corresponding ends of said side rails.

5. The apparatus of claim 3, wherein said arms each have a length, wherein said first and said second plates each have a pair of confronting flanges that are spaced apart a distance selected to substantially equal said length of said arms, and wherein individual ones of said flanges are bent downwardly and to the side, forming slots adapted to receive, and capture, the ends of said arms.

6. The apparatus of claim 3, wherein said arms each have first and second slots, said first slot is formed along a region of the length of the arm intermediate said axis of rotation and one of its ends, and said second slot is formed along a region of its length intermediate said axis of rotation and the other one of its ends, and wherein a post is fastened to corresponding ones of said plates in position to abut the confronting walls of said first and second slots for defining said first and said second rotation positions.

7. The apparatus of claim 6, wherein each of said arms further include third and fourth slots respectively intermediate said first and said second slots and corresponding ones of said ends.

8. The apparatus of claim 6, wherein said arms each further include an arcuate bearing surface that cooperates with said post to guide said plates during rotation between said first and said second positions.

9. Apparatus providing a wide range of lateral adjustment for mounting a headboard to a bed frame, comprising:
first and second side rails for supporting a bed;
first and second plates each having at least one aperture for mounting a headboard;
first means for mounting said first plate to said first side rail for rotation in the plane of the first plate between a first position where said at least one aperture is to one side of said first side rail, and a second position, where said at least one aperture is to the other side of said first side rail; and
second means for mounting said second plate to said second side rail for rotation in the plane of the second plate between a first position, where said at least one aperture is to one side of said second side rail, and a second position, where said at least one aperture is to the other side of said second side rail.

10. The invention of claim 9, wherein said apertures are elongated slots.

11. The invention of claim 9, wherein said first and second means include an angle bracket, and wherein said first and second plates are rotatably mounted eccentrically to corresponding ones of said angle brackets.

12. The invention of claim 11, further including means coupled to corresponding ones of said angle brackets for limiting the rotation of said first and second plates between said first and said second positions.

13. The invention of claim 12, wherein said limiting means includes cooperative slots and a post.

14. The invention of claim 11, further including means coupled to corresponding ones of said angle brackets for removably retaining said first and said second plates in selected ones of said first and said second positions.

15. The invention of claim 14, wherein said removably retaining means includes flanges defining channels formed on individual ones of said first and second plates.

16. The invention of claim 11, further including means coupled to corresponding ones of said angle brackets for guiding said first and second plates during rotation thereof between said first and second positions.

17. The invention of claim 16, wherein said guiding means includes a bearing surface cooperative with a guide post fastened to said plate.

18. A bed frame operable to mount headboards of varying lateral dimensions, comprising:
a first side rail;
a first bracket having an arm and an apertured flange at a right angle thereto, said apertured flange is fastened to an end of said side rail, and said arm has first and second slots respectively intermediate a corresponding one of its ends and its center, and third and fourth slots respectively intermediate a corresponding one of its ends and a respective one of said first and said second slots;
a first plate having two elongated, spaced-apart apertures, an upstanding post, and confronting flanges each defining an arm-receiving slot;
means for rotatably mounting said first plate eccentrically to the arm of said first bracket for rotation in the plane of the first plate, said elongated slot extends in a first rotation position to one side of said first side rail, and extends in a second rotation position to the other side of said side rail, and wherein said post abuts said first slot in said first position, and abuts said second slot in said second position, and wherein the ends of said arm in both said first and said second rotation positions is received and captured by corresponding ones of said arm-receiving slots;
a second side rail;
a second bracket having an arm and an apertured flange at a right angle thereto, said apertured flange is fastened to an end of said side rail, and said arm has first and second slots respectively intermediate a corresponding one of its ends and its center point, and third and fourth slots respectively intermediate a corresponding one of its ends, and a respective one of said first and second slots;
a second plate having two elongated apertures, an upstanding post, and confronting flanges, each defining an arm-receiving slot; and
means for rotatably mounting said second plate eccentrically to said second bracket for rotation in the plane of the second plate, said elongated slots extend in a first rotation position to one side of said second side rail, and extends in a second rotation position to the other side of said second side rail, and wherein said post abuts said first slot in said first position and abuts said second slot in said second position, with the ends of said arms being captured, and received in corresponding ones of said arm-receiving slots.

19. The invention of claim 18, wherein said third and fourth slots of said arms of said first and second brackets are in registration with individual ones of said elongated slots of said first and said second plates.

20. The invention of claim 18, wherein said fastening means include rivets, and wherein said rotatable mounting means include rivets.

* * * * *